United States Patent [19]

Matsuo et al.

[11] Patent Number: 4,584,367

[45] Date of Patent: Apr. 22, 1986

[54] REACTIVE DISAZO COMPOUND

[75] Inventors: Tadashi Matsuo, Konosu; Yutaka Iizuka, Urawa; Koei Sato, Konosu, all of Japan

[73] Assignee: Nippon Kayaku Kabushiki Kaisha, Tokyo, Japan

[21] Appl. No.: 485,116

[22] PCT Filed: Aug. 6, 1982

[86] PCT No.: PCT/JP82/00307

§ 371 Date: Mar. 28, 1983

§ 102(e) Date: Mar. 28, 1983

[87] PCT Pub. No.: WO83/00495

PCT Pub. Date: Feb. 17, 1983

[30] Foreign Application Priority Data

Aug. 7, 1981 [JP] Japan .................. 56-122925

[51] Int. Cl.⁴ .............. G09B 62/09; D06P 1/382; D06P 3/40; D06P 3/66

[52] U.S. Cl. .................. 534/634

[58] Field of Search .............. 260/153, 146 T; 534/634

[56] References Cited

U.S. PATENT DOCUMENTS 3,647,778 3/1972 Andrew et al. .............. 260/153

FOREIGN PATENT DOCUMENTS 53-60935 5/1978 Japan .................. 260/153

Primary Examiner—Floyd D. Higel
Attorney, Agent, or Firm—Banner, Birch, McKie & Beckett

[57] ABSTRACT

A novel reactive disazo dyestuff of which the free acid form is represented by the formula

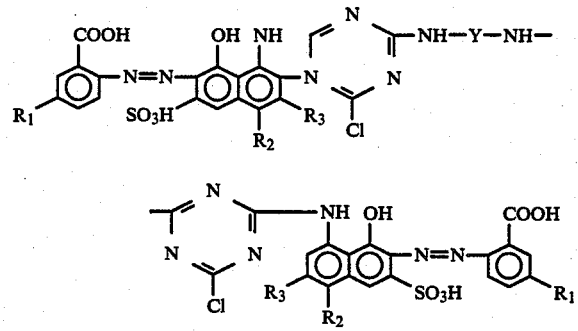

wherein $R_1$ represents hydrogen or carboxyl, $R_1$ and $R_2$ represent hydrogen or sulfo, either one of the $R_2$ and $R_3$ being hydrogen and the other being sulfo, and when $R_1$ is hydrogen, Y represents 2,5-dicarboxy-1,4-phenylene, 5-carboxyl-1,3-phenylene, or 2-carboxy-1,4-phenylene, and when $R_1$ is carboxyl, Y represents 1,4-phenylene, 1,3-phenylene, or 2-carboxy-1,4-phenylene which dye cellulosic fibers with excellent color-value and build-up property.

3 Claims, No Drawings

REACTIVE DISAZO COMPOUND

TECHNICAL FIELD

The present invention relates to a reactive disazo compound and process for dyeing cellulosic fibers by use of the compound.

BACKGROUND ART

Monohalotriazine dyes are well known to be generally useful for dyeing cellulosic fibers. However, these dyes have a drawback in that a considerable amount of the dye used is not fixed on the fiber because a side reaction occurs between the halotriazine reactive group and water instead of the reaction between the halotriazine reactive group and cellulose, thereby resulting in a low color value and poor build-up property of the dyed fiber. Besides such a loss of dye, the pollution on dyeing waste water containing the unfixed dye causes social problems such as environmental pollution.

It is also known that bis(monohalotriazine) dyes having an enforced affinity for cellulosic fibers are obtained by reacting two moles of a dihalotriazine with one mole of a diamine for the purpose of improving the fixing ratio of dye. This type of dye, however, generally exhibits a reverse relationship between the solubility of dye in water and the affinity of dye for cellulosic fibers, that is to say, the dye having the higher water-solubility tends to exhibit the lower affinity for cellulose fibers.

Consequently, the dye circles have been looking for a dye having a sufficient solubility in water as well as a strong affinity for cellulose fibers and high fixing ratio.

DISCLOSURE OF THE INVENTION

This invention provides a reactive disazo compound of which the free acid form is represented by the formula (1)

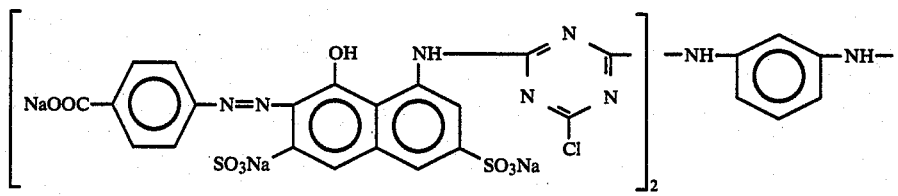

wherein $R_1$ represents hydrogen or carboxyl, $R_2$ and $R_3$ represents hydrogen or sulfo, either one of the $R_2$ and $R_3$ being hydrogen and the other being sulfo, and when $R_1$ is hydrogen, Y represents 2,5-dicarboxyl-1,4-phenylene, 5-carboxy-1,3-phenylene, or 2-carboxy-1,4-phenylene, and when $R_1$ is carboxyl, Y represents 1,4-phenylene, 1,3-phenylene or 2-carboxyl-1,4-phenylene. This invention also provides a process for dyeing cellulosic fibers by use of the disazo compound.

As shown in the above formula (1), the number of carboxyl groups, which are water soluble substituents, in a molecule of the compound of this invention is defined to be in the range of 3 to 5 and the positions of the substitution are specified, whereby it becomes possible to obtain a reactive disazo dye satisfying both solubility in water and affinity for cellulose, and by using it, dyed products excellent in color value and build-up property are obtainable.

Furthermore, while the color fastness to chlorine water in home laundry has become important together with other kinds of color fastness such as the fastness to light, wet and perspiration because of residual chlorine in city water and the current wide use of chlorine-containing bleaching agents, it has been found that a carboxyl group ortho-positioned with respect to the azo group of a diazo component, as in the disazo compound of this invention, improves the color fastness to chlorine water more than does a carboxyl group meta- or para-positioned.

For example, a monochlorotriazine dye which is analogous to the reactive disazo dye of this invention and represented by the formula

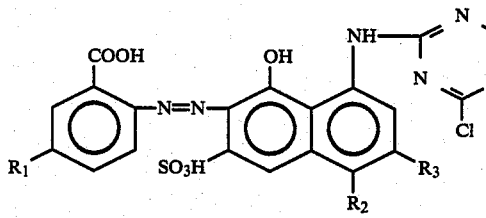

is described in Japanese Patent Kokai (Laid-Open) No. 25728/1973. It should be noted that the cellulosic fibers dyed with this dye exhibit a color fastness to chlorine water (ISO/R, 105/1V) of rating 2–3, while those dyed with the disazo dye of this invention are superior in the fastness, that is, as high as rating 4 to 5.

BEST MODE FOR CARRYING OUT THE INVENTION

The reactive disazo compound of the formula (1) of this invention can be prepared in various ways, for instance, by reacting two moles of cyanuric chloride, two moles of an aminoazo compound represented by the formula (2)

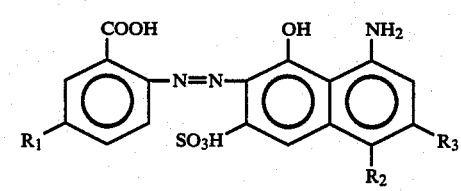

[$R_1$, $R_2$, and $R_3$ are as defined in the formula (1)], and one mole of a diamine represented by the formula

  (3)

[Y is as defined in the formula (1)] in arbitrary order or reacting two moles of cyanuric chloride, two moles of an aminonaphthol disulfonic acid represented by the formula

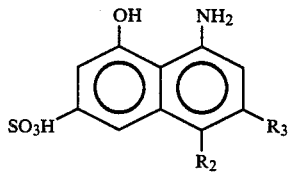  (4)

[$R_2$ and $R_3$ are as defined in the formula (1)], and one mole of a diamine represented by the formula (3) in arbitrary order, followed by coupling either product with two moles of a diazonium compound derived from an amine represented by the formula

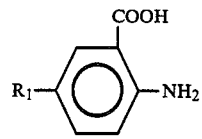  (5)

[$R_1$ is as defined in the formula (1)].

The disazo compound of this invention can also be prepared by reacting two moles of cyanuric chloride with two moles of an aminonaphtolsulfonic acid represented by the formula (4), and coupling the reaction product with two moles of a diazonium compound derived from an amine represented by the formula (5), followed by reacting the coupled product with one mole of a diamine represented by the formula (3).

In these processes, the reactions wherein cyanuric chloride participates can be performed, for example, in water at a pH of 3-7 in the presence of an acid-binding agent and at 0°-10° C. in the case of primary condensation and at 20°-50° C. in the case of secondary condensation. Soda ash or an alkali hydroxide, for example, is used as the acid-binding agent.

Compounds of the formula (3) used in this invention include those having formulas

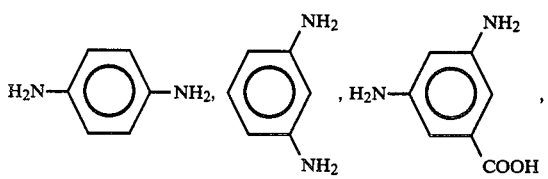

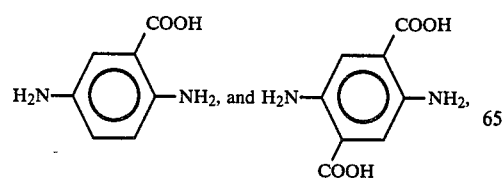

compounds of the formula (4) include those of

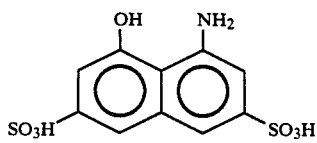 and 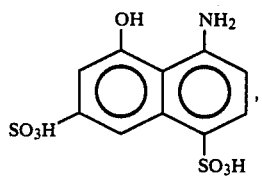

and compounds of the formula (5) include those of

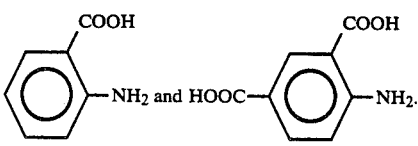

Cellulosic fibers to be dyed by the process of this invention include cotton, linen, viscose rayon, viscose staple, and cupra ammonium rayon and their blended fabrics, as well as union cloths and knits. The process for dyeing cellulosic fibers according to this invention is applied advantageously in particular to usual dip dyeing but also widely to usual printing and pad dyeing.

Acid-binding agents for use in the dyeing include sodium hydrogencarbonate, sodium metaphosphate, sodium orthosilicate, sodium metasilicate, sodium carbonate, and sodium hydroxide.

When this invention is applied to a dyeing process of relatively high good liquor ratio like a batchwise dip dyeing, the bath is usually made up from the present dye and an inorganic salt, such as sodium chloride or sodium sulfate, cellulosic fibers are dipped therein for 10-60 minutes at 30°-100° C., then said acid-binding agent is added, and the dyeing is continued for 20-60 further minutes at 60°-100° C. Alternatively, before dyeing, the acid-binding agent may be added to the bath; or after dyeing under neutral condition, the dye may be fixed by using a different bath which contains the acid-binding agent and the inorganic salt.

According to this invention, cellulosic fibers are dyed with a novel reactive disazo compound represented by the formula (1) in the presence of an acid-binding agent, thereby giving red dyed products with a high fixing ratio which are excellent in color value, buid-up property, and color fastness to chlorine water and to light.

This invention will be further illustrated with reference to the following Examples, wherein "parts" means "parts by weight".

EXAMPLE 1

A dyeing bath was prepared by using 2 parts of a dye in the form of free acid represented by the formula

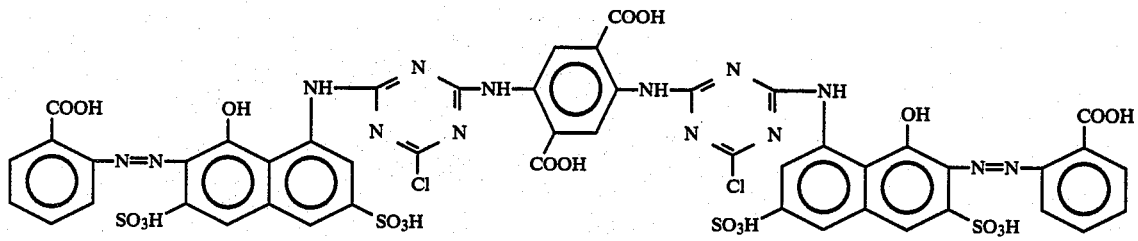

(6)

[λmax 516 (in pure water)], 80 parts of anhydrous sodium sulfate, and 1000 parts of water. A cotton knitted fabric (50 parts) was dipped in the bath at 80° C. for 30 minutes, then 20 parts of sodium carbonate was added, and the dyeing was continued for 60 minutes at the same temperature. After rinsing with water, the fabric was soaped with 1000 parts of an aqueous solution containing 2 parts of an anionic surfactant at 95°-100° C. for 10 minutes, and was rinsed with water and dried. Thus, a blueish, deep red dyed fabric with an excellent color value was obtained which showed a color fastness to light (JIS L-0842) of rating 4 or higher and a color fastness to chlorine water (ISO/R, 105/1V) of rating 4-5 or higher.

The above disazo compound had been prepared as follows:

To 90 parts of ice-cold water were added 0.1 part of Liponox NA (a dispersant of Lion corp.) and 1.4 parts of cyanuric chloride. After 30-minute stirring and making dispersion of the mixture, a solution of 3.6 parts of 1-hydroxy-2-(2-carboxyphenylazo)-8-amino-naphthalene-3,6-disulfonic acid disodium salt in 58 parts of water heated to about 60° C. was dropped thereinto during 40 minutes while keeping the liquid at a temperature of not exceeding 7° C. Immediately thereafter, the mixture was neutralized with aqueous sodium carbonate to pH 8. After the mixture was further stirred for about 2 hours, 0.9 part of disodium 2,5-diaminotelephthalate was added thereto. The mixture was heated to 40° C., neutralized with aqueous sodium carbonate to pH 8, and further stirred for 1.5 hours. Addition of 19 parts of sodium chloride, filtration, and drying at 60° C. gave 6.4 parts of the dye in the form of free acid of the formula (6).

EXAMPLES 2-9

Dyes in the form of free acid represented by the individual formulae shown in the following Table were prepared and used for dyeing, in the same manner as in Example 1, thereby giving deep red dyed fibers similarly excellent in color fastness to light and to chlorine water. Determined values of their color tone [λmax (water)], fastness to light (JIS L-0842), and fastness to chlorine water (ISO/R, 105/1V) are also shown in the Table.

| Example No. | Formula | Color tone ($\lambda_{max}$)* | A Color fastness to chlorine water  B Color fastness to light |
|---|---|---|---|
| 2 | | Blueish red (510 nm) | A Rating 4-5  B Rating 4 |
| 3 | | Blueish red (516) | A Rating 4-5  B Rating 4 |
| 4 | | Blueish red (515 nm) | A Rating 4-5  B Rating 4 |

| Example No. | Formula | Color tone ($\lambda_{max}$)* | A Color fastness to chlorine water / B Color fastness to light |
|---|---|---|---|
| 5 | [structure] | Blueish red (510) | A Rating 4–5 / B Rating 4 |
| 6 | [structure] | Blueish red (516) | A Rating 4–5 / B Rating 4 |
| 7 | [structure] | Blueish red (548 nm) | A Rating 4–5 / B Rating 4 |
| 8 | [structure] | Blueish red (502) | A Rating 4–5 / B Rating 4 |
| 9 | [structure] | Blueish red (512) | A Rating 4–5 / B Rating 4 |

EXAMPLE 10

A solution (1000 parts) containing 20 parts of the dye of Example 2, 100 parts of urea, 1 part of sodium alginate, and 20 parts of sodium carbonate was prepared and used for pad dyeing of a cotton cloth. The cloth impregnated with the dye solution was squeezed through pad rolls so that the weight of the squeezed cloth becomes 1.7 times the original weight of the cloth. Then, the cloth was intermediately dried at 100° C. for 2 minutes and baked at 170° C. for 2 minutes.

Thereafter, similar rinsing, soaping, rinsing, and drying of the cloth as in Example 1 gave a blueish, deep red dyed fibers which exhibited a color fastness to light (JIS L-0842) of rating 4 and a color fastness to chlorine water (ISO/R, 105/1V) of rating 4.

EXAMPLE 11

A mixture of 20 parts of the dye of Example 8 and 100 parts of urea was dissolved by adding 380 parts of warm water. The dye solution was added to 500 parts of 5% aqueous sodium alginate solution containing 20 parts of Polymine L New (a reduction inhibitor of Nippon Kayaku Co., Ltd.) and 40 parts of sodium hydrogencarbonate. The mixture was well stirred to prepare a color paste. The paste was printed on a cotton cloth by use of a screen. After intermediate drying at 100°–103° C., the cloth was subjected to steaming for 10 minutes. Then, similar rinsing, soaping, rinsing, and drying of the cloth as in Example 1 gave a blueish, deep red dyed product which exhibited a color fastness to light (JIS L-0842) of rating 4 and a color fastness to chlorine water (ISO/R 105/1V) of rating 4–5.

We claim:

1. A reactive disazo compound which, in the free acid form, is represented by the formula
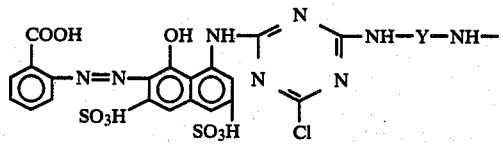
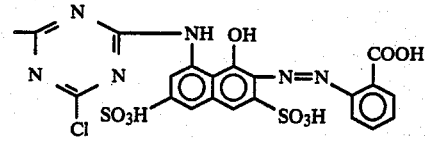
wherein Y represents 2,5-dicarboxy-,4-phenylene, or 5-carboxy-1,3-phenylene.
2. The reactive disazo compound of claim 1, which is represented by the following formula,
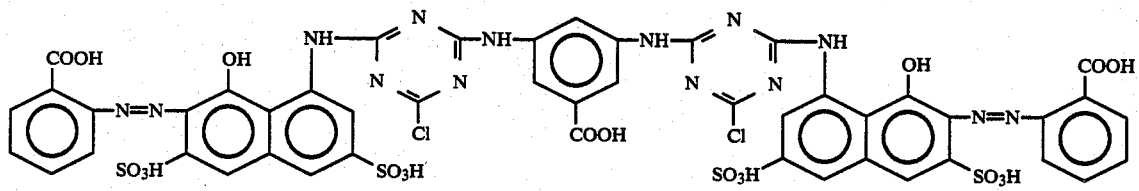
3. The reactive disazo compound of claim 1, which is represented by the following formula,
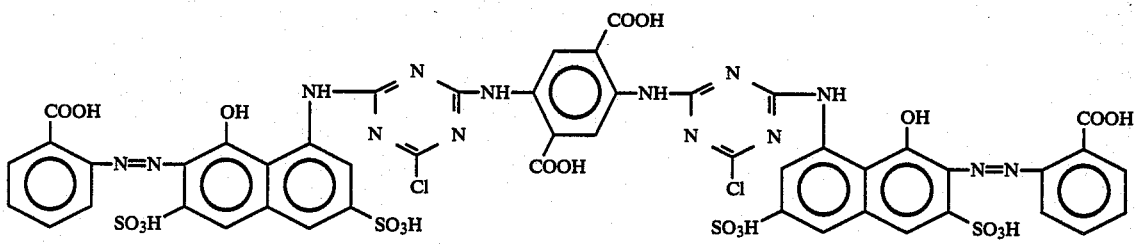
* * * * *